US009126613B2

(12) United States Patent
Savage et al.

(10) Patent No.: US 9,126,613 B2
(45) Date of Patent: Sep. 8, 2015

(54) MOVABLE CART

(71) Applicant: Carter Hoffmann, Inc., Mundelein, IL (US)

(72) Inventors: Ryan J. Savage, Crystal Lake, IL (US); Robert C. Fortmann, Grayslake, IL (US)

(73) Assignee: Carter Hoffmann, Inc., Mundelein, IL (US)

( * ) Notice: Subject to any disclaimer, the term of this patent is extended or adjusted under 35 U.S.C. 154(b) by 0 days.

(21) Appl. No.: 14/591,337

(22) Filed: Jan. 7, 2015

(65) Prior Publication Data

US 2015/0191192 A1 Jul. 9, 2015

Related U.S. Application Data

(60) Provisional application No. 61/925,325, filed on Jan. 9, 2014.

(51) Int. Cl.
*B62B 3/00* (2006.01)
*B62B 3/10* (2006.01)

(52) U.S. Cl.
CPC ...................... *B62B 3/108* (2013.01)

(58) Field of Classification Search
CPC ........ B62B 3/003; B62B 3/004; B62B 3/005; B62B 3/006; B62B 2202/67; A47B 2031/002; B65D 19/40; B65D 2519/00676; Y10T 403/3993
See application file for complete search history.

(56) References Cited

U.S. PATENT DOCUMENTS

| 2,652,308 | A | * | 9/1953 | Peterson | 312/311 |
| 2,845,780 | A | | 8/1958 | Conklin et al. | |
| 3,160,452 | A | | 12/1964 | Rothman | |
| 3,275,393 | A | | 9/1966 | Stentz et al. | |
| 3,531,169 | A | | 9/1970 | Hoffman et al. | |
| 3,575,288 | A | * | 4/1971 | Brucken | 206/320 |
| 3,610,429 | A | | 10/1971 | McKay | |
| 3,695,649 | A | * | 10/1972 | Laverone | 403/231 |
| 3,815,966 | A | * | 6/1974 | Lyman, Jr. | 312/351.12 |
| 3,837,754 | A | * | 9/1974 | Malcik | 403/217 |
| 3,868,123 | A | * | 2/1975 | Berg et al. | 280/79.2 |
| 3,890,022 | A | * | 6/1975 | Moon | 312/140 |
| 4,045,104 | A | * | 8/1977 | Peterson | 312/265.4 |
| 4,235,559 | A | * | 11/1980 | Rooklyn | 403/262 |
| 4,419,938 | A | * | 12/1983 | Kaut | 108/190 |

(Continued)

OTHER PUBLICATIONS

TQ Quiet Carts, Carlisle FoodService Products, Dec. 16, 2013, 2 pages, http://www.carlislefsp.com/tray-delivery-carts/tq-quiet-carts.

(Continued)

*Primary Examiner* — Hau Phan
*Assistant Examiner* — Jacob Meyer
(74) *Attorney, Agent, or Firm* — Brinks Gilson & Lione

(57) ABSTRACT

A cart is provided. The cart includes a plurality of walls to define an internal volume and a top surface. The top surface comprises a planar portion that is enclosed by edges along its perimeter, some or all of the edges including upstanding portions that extend above the planar portion. One or more of the upstanding portions includes an open portion proximate to the intersecting adjacent edge that forms a gap therebetween. A plurality of caps are provided, with a cap disposed upon each corner to contact the planar portion and the upstanding portions of the edges and enclose the gap in each corner.

22 Claims, 5 Drawing Sheets

(56) References Cited

U.S. PATENT DOCUMENTS

| | | | | |
|---|---|---|---|---|
| D283,769 S * | 5/1986 | Cohn | | D6/671 |
| 4,627,760 A * | 12/1986 | Yagi et al. | | 403/201 |
| 4,691,970 A * | 9/1987 | Neri | | 312/265.5 |
| 4,786,122 A * | 11/1988 | Nichoalds | | 312/257.1 |
| 4,848,859 A * | 7/1989 | Edmonds et al. | | 312/257.1 |
| 4,998,023 A * | 3/1991 | Kitts | | 280/47.35 |
| 5,011,240 A | 4/1991 | Kelley et al. | | |
| 5,069,466 A * | 12/1991 | Propst | | 280/79.3 |
| 5,259,668 A * | 11/1993 | Teufel et al. | | 312/249.11 |
| 5,282,678 A * | 2/1994 | Teufel et al. | | 312/221 |
| 5,330,060 A | 7/1994 | Bohner | | |
| 5,372,262 A * | 12/1994 | Benson et al. | | 211/26 |
| 5,465,660 A * | 11/1995 | Conti et al. | | 100/48 |
| 5,490,455 A * | 2/1996 | Conti et al. | | 100/50 |
| 5,531,464 A * | 7/1996 | Maurer et al. | | 280/47.35 |
| 5,605,344 A * | 2/1997 | Insalaco et al. | | 280/47.34 |
| 5,647,650 A * | 7/1997 | Daugherty et al. | | 312/265.1 |
| 5,651,596 A * | 7/1997 | Carlson et al. | | 312/334.46 |
| 5,673,983 A * | 10/1997 | Carlson et al. | | 312/218 |
| 5,673,984 A * | 10/1997 | Insalaco et al. | | 312/264 |
| 5,716,116 A * | 2/1998 | Carlson et al. | | 312/280 |
| 5,743,607 A * | 4/1998 | Teufel et al. | | 312/265.2 |
| 5,803,559 A * | 9/1998 | Carlson et al. | | 312/265.1 |
| 5,805,075 A * | 9/1998 | Carlson et al. | | 312/215 |
| 5,881,980 A * | 3/1999 | Knudson | | 248/188.8 |
| 5,915,803 A * | 6/1999 | Daugherty et al. | | 312/263 |
| 6,164,738 A * | 12/2000 | Dane et al. | | 312/311 |
| 6,202,867 B1 * | 3/2001 | Di Blasi et al. | | 211/188 |
| 6,263,602 B1 * | 7/2001 | Seiber et al. | | 40/594 |
| 6,401,940 B1 * | 6/2002 | Hartel et al. | | 211/26 |
| 6,502,702 B1 * | 1/2003 | Hsue et al. | | 211/26 |
| 6,796,565 B2 * | 9/2004 | Choi et al. | | 280/47.35 |
| 6,811,164 B2 * | 11/2004 | Trogstam | | 280/79.3 |
| 7,111,853 B2 * | 9/2006 | Tracewell et al. | | 280/79.2 |
| 7,296,808 B2 * | 11/2007 | Huguet | | 280/47.34 |
| 7,429,142 B2 * | 9/2008 | Reike et al. | | 403/194 |
| 7,544,915 B2 * | 6/2009 | Hu | | 219/387 |
| 7,950,679 B2 * | 5/2011 | Claffy | | 280/47.35 |
| 8,360,447 B2 * | 1/2013 | Knoppers | | 280/79.3 |
| 8,465,030 B2 * | 6/2013 | Boivin et al. | | 280/47.34 |
| 8,613,456 B2 * | 12/2013 | Grela et al. | | 280/79.2 |
| 8,690,170 B2 * | 4/2014 | Belanger et al. | | 280/79.3 |
| 2003/0121874 A1 * | 7/2003 | Koester et al. | | 211/187 |
| 2006/0182492 A1 * | 8/2006 | Keller | | 403/170 |
| 2006/0185229 A1 * | 8/2006 | Korte et al. | | 47/18 |
| 2006/0220507 A1 * | 10/2006 | Steele et al. | | 312/330.1 |
| 2007/0243014 A1 * | 10/2007 | Rieke et al. | | 403/408.1 |
| 2008/0042378 A1 * | 2/2008 | Dick et al. | | 280/29 |
| 2008/0315624 A1 * | 12/2008 | Claffy | | 296/181.6 |
| 2009/0211498 A1 * | 8/2009 | Shea | | 108/57.29 |
| 2010/0170287 A1 * | 7/2010 | Boss | | 62/441 |
| 2011/0025006 A1 * | 2/2011 | Knoppers | | 280/47.34 |
| 2011/0133616 A1 | 6/2011 | Qin | | |
| 2012/0012596 A1 * | 1/2012 | Hollebone et al. | | 220/694 |
| 2013/0146553 A1 * | 6/2013 | Preidt et al. | | 211/153 |
| 2013/0221820 A1 * | 8/2013 | Chang | | 312/330.1 |
| 2013/0241165 A1 * | 9/2013 | Boivin et al. | | 280/79.2 |
| 2015/0040606 A1 * | 2/2015 | Hernanz Arbeloa et al. | | 62/457.1 |

OTHER PUBLICATIONS

Q30 Transporter/Food Locker, Dec. 15, 2013, 3 pages, http://medicalinnovations.co.za/product/q30-transporterfood-locker.

Top O' The Table New Products, Product Bulletin, D-Lite Tray Delivery Carts, Sep. 8, 2011, 1 page.

\* cited by examiner

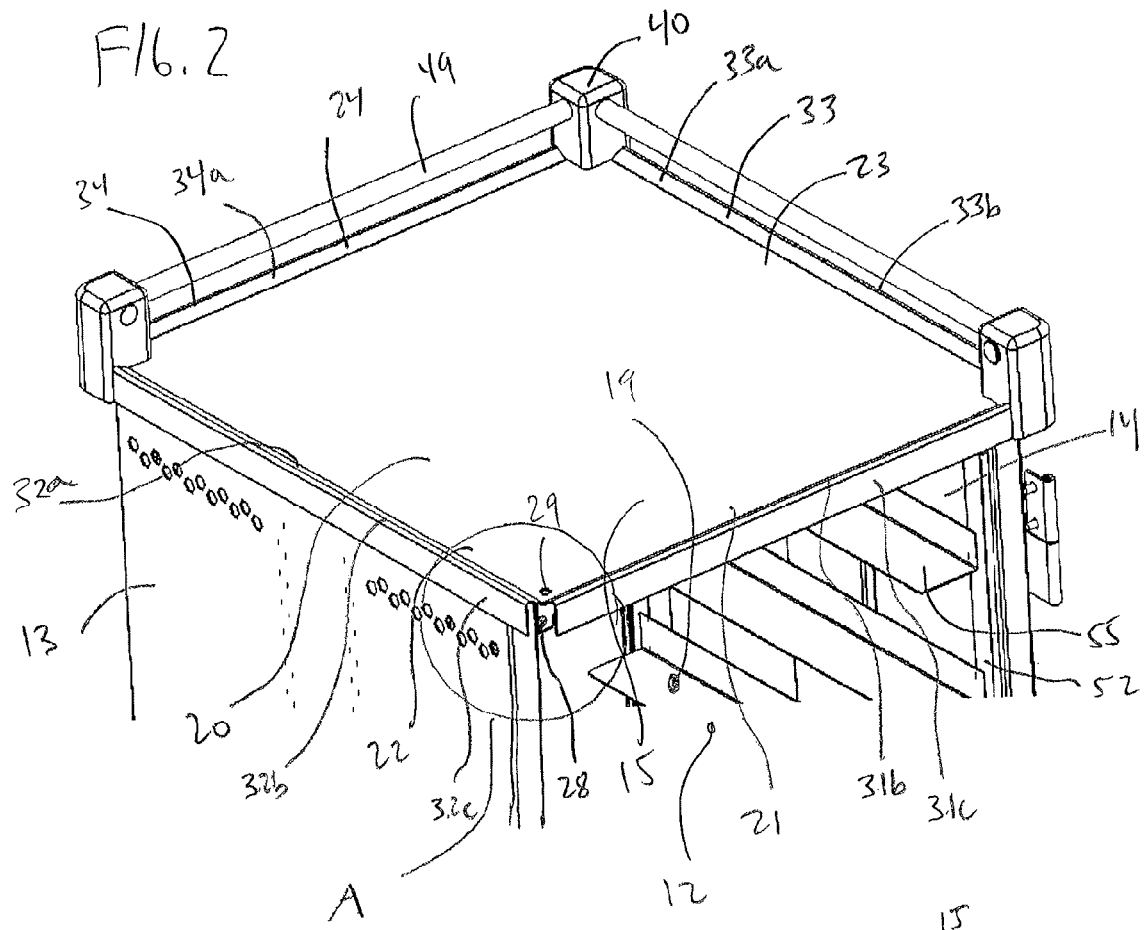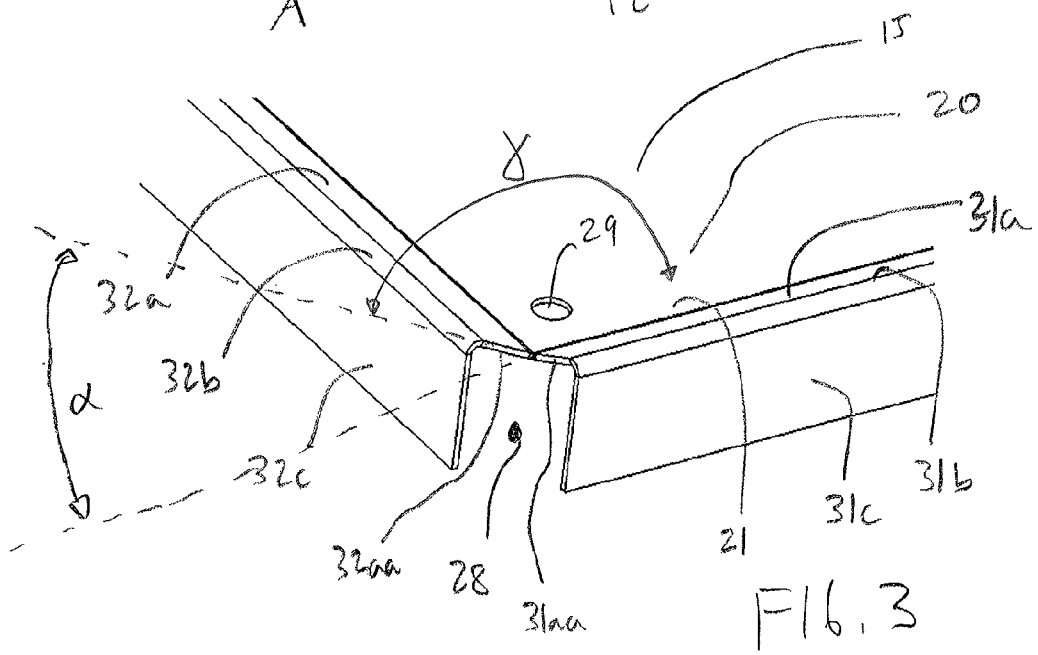

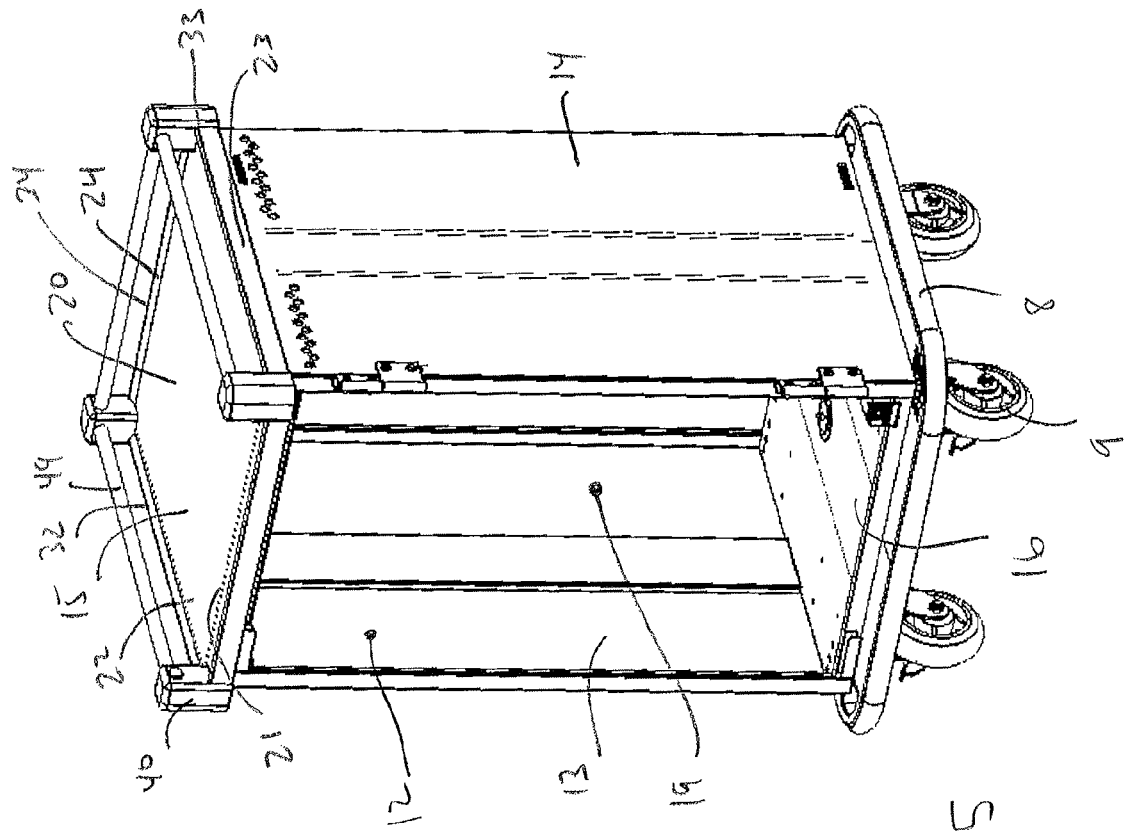
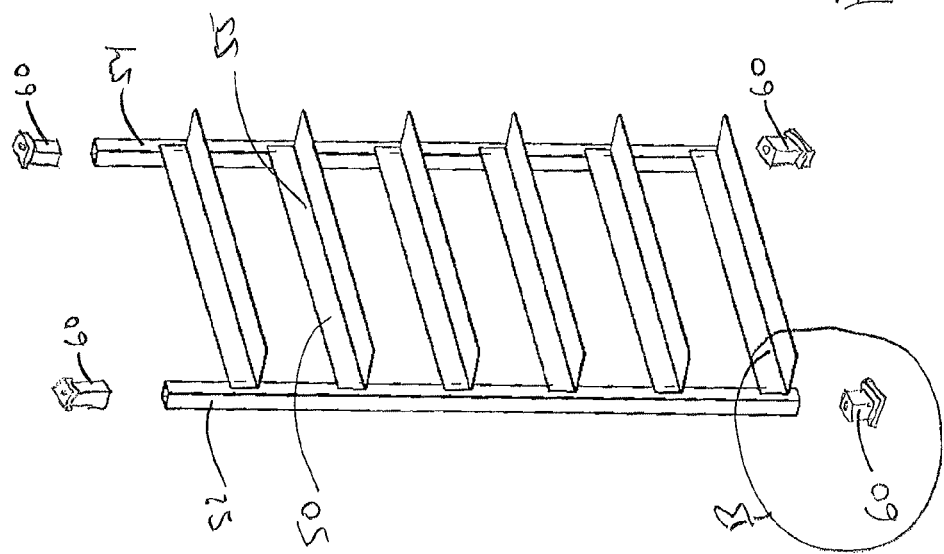
FIG. 5

MOVABLE CART

CROSS-REFERENCE TO RELATED APPLICATIONS

This application claims priority from U.S. Provisional Application No. 61/925,325 filed on Jan. 9, 2014, the entirety of which is hereby fully incorporated by reference herein.

TECHNICAL FIELD

This disclosure relates to movable carts, such as carts that are used in hospitals, jails, banquet rooms, aircraft, trains, or elsewhere in the service industry where multiple trays of food product are transported from a kitchen to end users located at different locations of a facility or compartment.

BRIEF SUMMARY

A first representative embodiment of the disclosure is provided. The embodiment includes a cart configured to support of one or more items therein. The cart includes a top wall, left and right side walls, and a bottom wall in combination defining an internal volume for receipt of one or more items therein. The top surface comprises a planar portion that is at least partially enclosed by a front edge, a right edge, a left edge, and a rear edge, wherein the planar portion includes a plurality of corners where adjacent edges intersect, wherein one or more of the front edge, right edge, left edge, and rear edge includes an upstanding portion that extends above the planar portion. One or more of the front edge, right edge, left edge, and rear edge that includes the upstanding portion includes an open portion disposed proximate to the intersecting adjacent edge of the front edge, right edge, left edge, and rear edge. A plurality of caps are provided with one of the plurality of caps disposed upon each of the plurality of corners, wherein each of the plurality of caps defines a bottom surface that contacts the planar portion of the top surface and the upstanding portion of each of the two adjacent edges at each respective corner. Each of the plurality of caps that are disposed upon a corner with an edge that includes that includes an open portion encloses the respective open portion such that the upstanding portions of each intersecting adjacent edge extends from the respective cap.

A second representative embodiment of the disclosure is provided. The embodiment includes a cart configured to support of one or more items therein. The cart includes a top surface, left and right side walls, and a bottom wall in combination defining an internal volume for receipt of one or more items therein. The top surface comprises a planar portion and is at least partially enclosed by a front edge, a right edge, a left edge, and a rear edge, wherein the planar portion includes a plurality of corners where adjacent edges intersect, and each of the front edge, right edge, left edge, and rear edge includes an upstanding portion that extends above the planar portion. Each of the front edge, right edge, left edge, and rear edge includes an open portion disposed proximate to the intersecting adjacent edge of the front edge, right edge, left edge, and rear edge. A plurality of caps are provided, with one of the plurality of caps disposed upon each of the plurality of corners, and each respective cap of the plurality of caps enclosing the open portion of the two intersecting adjacent edges at each respective corner such that the upstanding portions of each intersecting adjacent edge extends from the respective cap, wherein each of the plurality of caps defines a bottom surface that contacts the planar portion of the top surface and the upstanding portion of each of the two adjacent edges at each respective corner.

A third representative embodiment of the disclosure is provided. The embodiment includes a cart configured to support of one or more items therein. The cart includes a top wall, left and right side walls, and a bottom wall in combination defining an internal volume for receipt of one or more items therein. The internal volume of the cart includes a shelf assembly, the shelf assembly comprises a frame formed from first and second vertical posts that are mounted to the bottom wall, the two vertical posts supporting a plurality of horizontal tray support members, further comprising first and second plugs that are disposed between the bottom surface and a bottom end of respective first and second vertical posts, each plug preventing direct contact between the bottom wall and the respective vertical post.

Advantages of the disclosed devices will become more apparent to those skilled in the art from the following description of embodiments that have been shown and described by way of illustration. As will be realized, other and different embodiments are contemplated, and the disclosed details are capable of modification in various respects. Accordingly, the drawings and description are to be regarded as illustrative in nature and not as restrictive.

BRIEF DESCRIPTION OF THE DRAWINGS

FIG. 2 is a partially exploded perspective view of the top of the movable cart of FIG. 1.

FIG. 3 is a view of Detail A of FIG. 2.

FIG. 5 is the view of FIG. 4 with the shelf assembly removed from the internal volume of the cart.

DETAILED DESCRIPTION OF THE DRAWINGS AND THE PRESENTLY PREFERRED EMBODIMENTS

Figure 1:
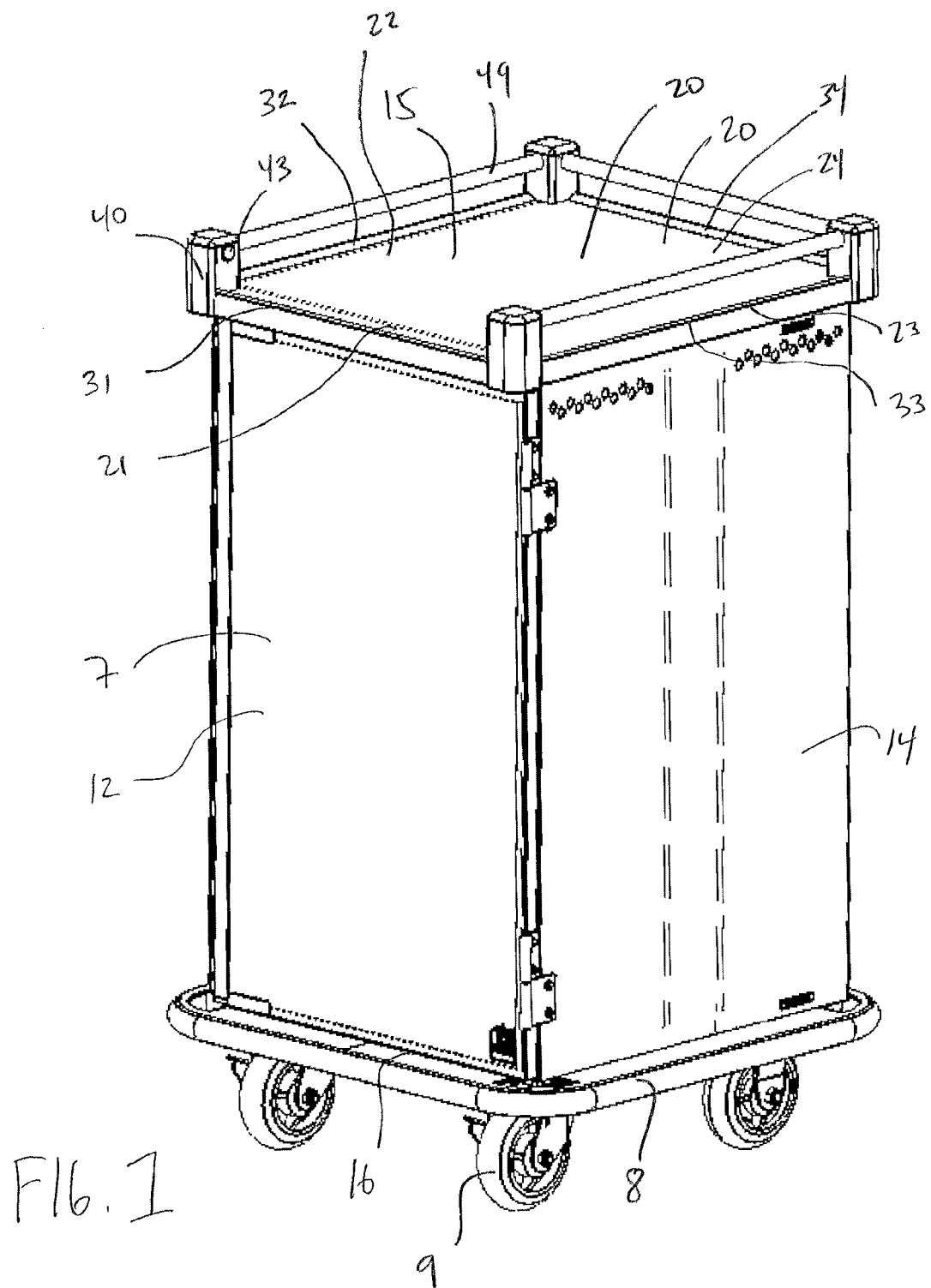
FIG. 1 is a perspective view of a movable cart.
Figure 4:
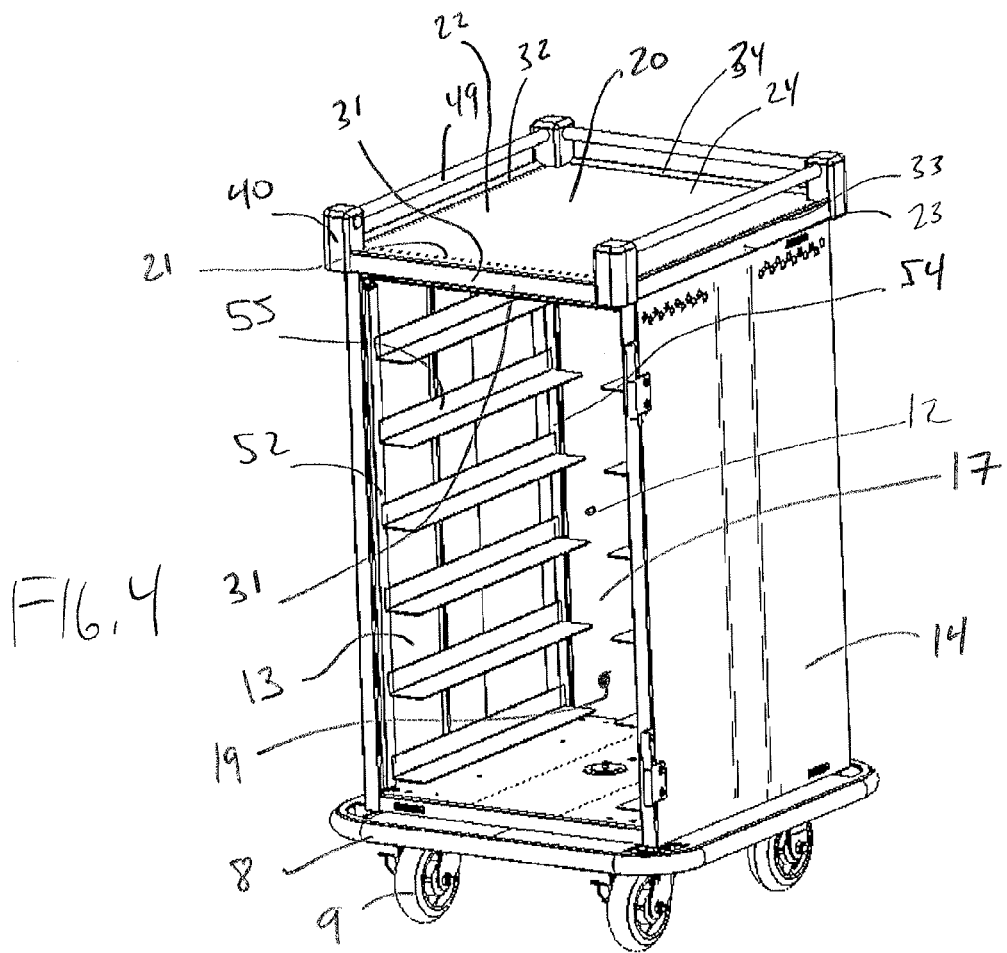
FIG. 4 is a perspective view of the cart of FIG. 1 depicting a shelf assembly disposed within the internal volume of the cart.

Turning now to FIGS. 1-7, a cart 10, such as a movable cart mounted on a plurality of wheels or castors 9, is provided. The cart 10 includes an internal volume 19 (FIG. 4) that is configured to receive and enclose a plurality of food trays (such as hospital trays, cafeteria trays, or the like) or other food products or non-food objects therein. In some embodiments, the cart 10 may be configured for or be capable of providing heat or refrigeration or cooling to the internal volume 19 in situations where the cart is connected to a source of electrical power, and in some embodiments the heat, refrigeration, or cooling may also be provided when the cart 10 is being transported through a facility and not connected to a source of electrical power.

The cart 10 includes an open front side 12, closed right and left sides 13, 14, a top 15, a bottom 16, and a rear side 17, which may be open or closed. In some embodiments, the open front side 12 may be selectively closed by one or more doors mounted with respect to the front side 12, and in embodiments where the rear 17 is open, one or more doors 7 may be provided to selectively close the rear side 17 as well.

The internal volume 19 of the cart 10 may be configured to receive and support a plurality of trays or other objects (not shown) in a stacked fashion therein. The internal volume may include a shelf assembly 50 (FIG. 5), which includes two corresponding assemblies that are disposed proximate to the right and left walls 13, 14 and are configured to slidably receive trays through the front and/or rear sides 12, 17 of the cart 10. Each assembly of the shelf assembly 50 may include two vertical posts 52, 54 that are mounted directly or indirectly with one or both of the top and bottom 15, 16 of the cart 10, and a plurality of horizontal support members 55 that span between the vertical posts 52, 54 and are positioned at various heights within the internal volume 19 to support a plurality of trays. In some embodiments, the vertical posts 52, 54 are hollow about their entire length, while in other embodiments, the end portions of each post 52, 54 are hollow, while a central portion may be filled, either formed as a solid post of the material that the post is formed from (such as stainless steel, for example), or filled with another material such as a high density foam for strength purposes.

In some embodiments, the shelf assembly 50 may include multiple of sets of vertical posts 52, 54 and horizontal support members 55 that are proximate to each of the right and left walls 13, 14, instead of a single set of vertical posts 52, 54 and horizontal support members 55 proximate to each wall.

Figure 6:
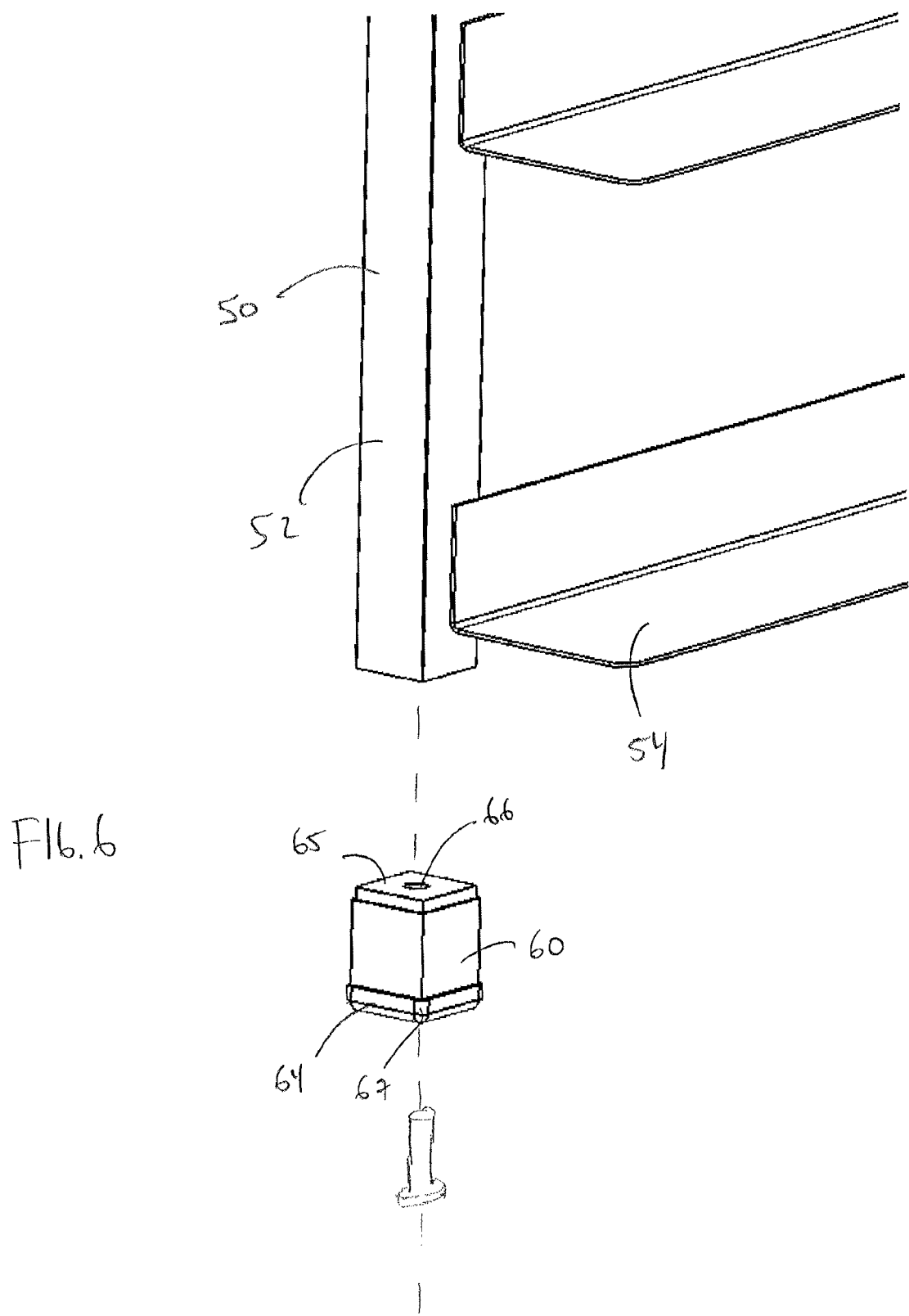
FIG. 6 is a view of Detail B of FIG. 5.

As best shown in FIG. 6, a support plug 60 may be disposed between each end of each vertical post 52, 54 and the respective top or bottom wall 15, 16 that the post is connected to (directly or indirectly). The support plug 60 may include an upper portion 62 that is configured to extend within the hollow end portion of the respective post 52, 54 and a flange portion 64 that extends outside of the post and contacts the end edge of the respective post when installed. The upper portion 62 of the support plug 60 is sized and shaped to fit snuggly within the hollow post 52, 54 when installed therein. In some embodiments, the flange portion 64 of the plug 60 extends to the same outer dimensions as the end of the respective post 52, 54, while in other embodiments, the flange portion 64 extends to larger dimensions than the outer dimensions of the end of the respective post 52, 54. The flange portion 64 of plug 60 is configured such that the respective post does not make any direct contact with the top or bottom 15, 16 of the cart, which mechanically supports the respective post 52, 54. The posts 52, 54 and the remaining structure of the shelf assembly 50 are disposed within the internal volume 19 of the cart 10 such that no portion of the shelf assembly 50 directly contacts any portion of the cart 10.

In some embodiments, the posts 52, 54 may include an internal mounting surface (not shown) that is configured to mate (flushly or otherwise) with a top 65 of the support plug 60. The support plug 60 may be fixed to the respective end of the post 52, 54 with a press-fit connection, and/or with adhesive. The support plug 60 may include a through hole 66 along its length to allow for a fastener 70 to extend from the respective top or bottom 15, 16 of the cart, through the support plug 60 and mate with the internal mounting surface in the post.

The support plugs 60 may be made from an elastomer that is known to dampen or attenuate vibrations that are imparted upon the support plugs 60. Some suitable materials for the support plugs 60 may be rubber, such as for example 70 durometer urethane rubber, silicone, plastics, or the like. The support plugs 60 are configured to significantly limit or prevent the transfer of any vibrations that are transferred to the shelf assembly 50 from the trays or other objects disposed thereon from being ultimately transferred to the cart 10 from the support posts 52, 54. The elastomeric material of the support plugs 60 between the support posts 52, 54 (in some embodiments both opposite ends of the support posts 52, 54 that are supported by the top and bottom 15, 16, respectively) dampens or attenuates any vibrations imparted upon the support plugs 60 and prevents or significantly reduces the transfer from the support plugs 60. In some embodiments, one or both of the body 62 or the flange 64 of the support plug 60 may include one or both of a chamfer, protrusion, or other alignment structure to allow for the support plug 60 to be consistently and easily installed into a desired position within the support post 60, such as with the chamfer or protrusion providing a visual and/or tactile alignment feature for consistent placement during the manufacturing process.

The top 15 of the cart 10 may include a surface that is configured to support structures (either food or other structures, such as trays, coffee pots, utensils, menus, cups, and the like) thereon. At least a portion of the top 15 may include a planar portion 20 that serves as a universal support structure for various structures to be placed thereon. In some embodiments, at least some portion of the top surface 15 may additionally include dedicated support structures, such as utensil holders, cup holders, and the like. The top 15 is defined by a front edge 21, a right edge 22, a left edge 23, and a rear edge 24, which each may be disposed above and generally parallel with the similar side (front, right, left, and rear sides 12, 13, 14, 17). As best shown in FIG. 2, adjacent edges may intersect to form first, second, third, and fourth corners 35, 36, 37, 38 upon the top 15 of the cart 10.

In some embodiments, one, some, or all of the front, right, left, and rear edges 21, 22, 23, 24 may include an upstanding portion 31, 32, 33, 34, respectively, that extends vertically above the planar portion 20 of the top 15. In some embodiments, the upstanding portions in combination may form a marine edge, which extends above the height of the planar portion 20 to prevent any liquid spills or free items upon the top 15 from dripping or falling off of the cart 10.

In some embodiments, one or more, or in some of embodiments, all, of the upstanding portions 31, 32, 33, 34 may extend for only a portion of the length of each respective edge, such that, in some embodiments, the upstanding portions 31, 32, 33, 34 of the adjacent edges do not contact each other. For example, as shown in FIG. 3, the upstanding portions 31 and 32 of the front and right edges 21, 22, respectively, do not contact each other at the corner 35, and the separation between the upstanding portions 31, 32 of the front and right edges 21, 22 forms a gap 28 therebetween.

Each upstanding portion 31, 32, 33, 34 may be monolithically formed from the material that forms the top 15 of the cart 10. For example, the top of the cart 10 may be formed from a planar sheet of material (for example, stainless steel) with the upstanding portions formed by selectively bending the material, and removing material to form the gaps 28 discussed above. The formation of the planar portion 20 and the upstanding portions 31, 32, 33, 34 from a single sheet of material allows for the top 15 of the cart 10 to be formed without any welds or other joints.

As best shown in FIG. 3, one or more of the upstanding portions 31, 32, 33, 34 may be formed with several different surfaces. The front upstanding portion 31 will be discussed in detail here, but it can be understood that the other upstanding portions 32, 33, 34 may be formed in the same manner. The upstanding portion 31 may include an angled portion 31a that extends from the planar portion 20 and is offset from the planar portion 20 along an edge, normally a straight edge, therebetween. The angled portion 31a may be formed at an oblique angle with respect to the planar portion 20, or may be perpendicular to the planar portion 20. In some embodiments, the angled portion may be at an angle $\alpha$ of about 30 to 60 degrees (when measured away from the planar portion 20 as shown in FIG. 3) (inclusive of all angles therein, such as 35, 45, 55 degrees) with respect to the planar portion 20. The supplementary angle γ of the angle α (FIG. 3) may be an obtuse angle (i.e. the angled portion extends with a vector component away from the planar portion 20) to maximize the usable space of the planar portion 20 and to facilitate cleaning, but in some embodiments, the angled portion 31a may extend with a vector component toward the planar portion 20.

The upstanding portion 31 may additionally include a top 31b that transitions from the angled portion 31a. The top 31b may be planar (with a constant width, or a varying width along its length), or the top 31b may be curved along its length. The upstanding portion 31 may further include an outer surface 31c, which in some embodiments extends vertically downward from the top 31b. The outer surface 31c may extend downward past the plane that the planar portion 20 extends through, or it may end above the level of the planar portion 20. In some embodiments, the outer surface 31c may be fixed to the corresponding side of the cart, either with a weld, fasteners, adhesive or the like.

As best shown in FIG. 3, the tips of the adjacent angled portions 31a, 31b may meet at a corner, with the material forming the angled portions 31a, 32 cut such that the ends 31aa, 32aa taper away from each other to form the gap when the upstanding portions 31, 32 are shaped into their final orientation. The upstanding portions 31a, 32a may be formed such that at least the outer surfaces 31c, 32c are at the same distance from each other along their length.

The corners 35, 36, 37, 38 of the top 15 are each configured to receive a cap 40 thereon, which encloses the gaps 28 between adjacent upstanding portions (e.g. 31, 32 at corner 35) and when the caps 40 are installed upon each corner, the combination of the upstanding edges 31, 32, 33, 34 and the caps 40 upon each corner provides for a uniform barrier to prevent spillage or falling of liquid or objects that are placed upon the top 15 of the cart 10, which tends to happen when a cart 10 with a flat top surface is accelerated (speeding up or stopped) quickly.

Figure 7:
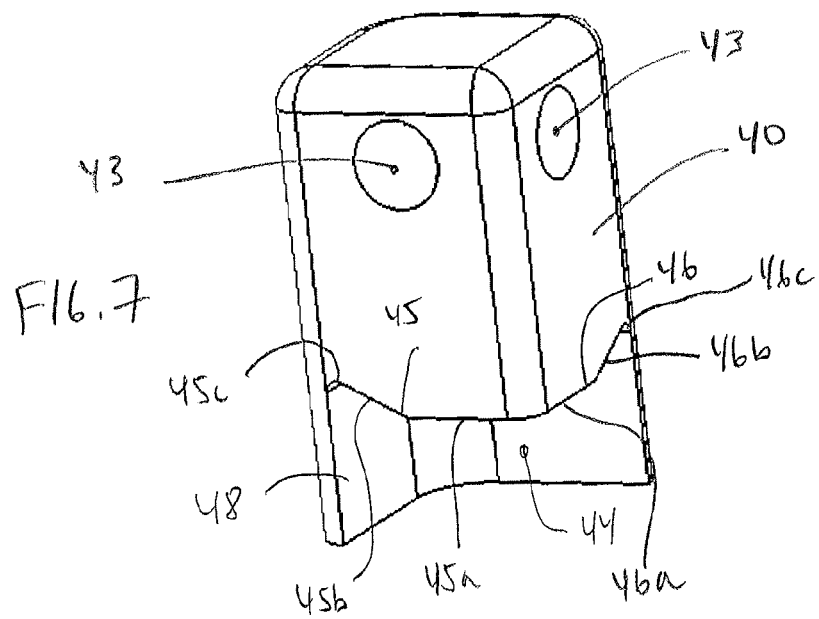
FIG. 7 is a perspective view of the cap used with the top of the movable cart of FIG. 1.

As discussed above, the caps 40 are configured to enclose the gaps 28 that are provided between adjacent upstanding edges (e.g. 31, 32) located proximate to the corners (e.g. 35) of the top 15, such that the combination of the caps 40 and the upstanding edges provides a full upstanding edge around the entire perimeter of the planar surface 20. As shown in FIG. 7, the cap 40 may include an opening 44 with lower edges 45, 46 that are configured to rest upon a portion of the planar portion 20 (or other portion of the top 15) and the ends of the two upstanding portions (e.g. 31, 32) in the corner (e.g. 35) where the cap 40 is fixed. The lower edges 45, 46 may include a horizontal portion (45a, 46a) that rests upon the planar portion 20, an inclined portion (45b, 46b) that rests upon the angled portion of each upstanding portion and is formed at the same angle and length of the angled portion, a top portion (45c, 46c). The caps 40 further include a skirt 48 that rests upon the outer surface (31c, 32c) of each upstanding edge and covers the gap 28 therebetween. In some embodiments, the caps 40 may be sized to extend radially outward from the sides and walls (12, 13, 14, 17) of the cart such that the caps 40 (and in some embodiments a bumper 8 disposed proximate to the bottom surface 15 of the cart) contact vertical walls and other foreign objects, instead of other surfaces of the cart to limit damage from the cart or to the cart 10 if collisions occur. The caps 40 (and the bumper 8) may be made of a plastic (such as HDPE) or an elastomeric material to allow the caps 40 to function as a bumper and to minimize or eliminate damage if collisions occur.

The caps 40 may be fixed to the planar portion 20 of the top with a fastener, such as a fastener that extends through a hole 29 (FIG. 3) in the planar portion (within the enclosed portion of the cap 40) that is received within a hole in the cap 40 or otherwise mechanically fixed to the cap 40. Alternatively or additionally, the cap 40 may be fixed to the planar portion 20 and/or one or both of the upstanding edges that intersect with the cap 40 with adhesive, a press fit, or other conventional mechanical retention structures.

The caps 40 may each include one or two apertures 43 that are aligned with one or both of the upstanding portions that are enclosed by the caps 40. The apertures 43 are configured to receive the ends of rods 49 or other structures that are aligned in parallel to and spaced above some or all of the upstanding edges of the top 15 in order to provide an additional barrier to retain objects or food placed upon the top of the cart. In some embodiments, the front (or one or more other sides) of the cart 10 may not include a rod, with the other three sides including a rod 49, while in other embodiments, all sides include a rod 49.

While the preferred embodiments of the disclosure have been described, it should be understood that the disclosure is not so limited and modifications may be made without departing from the invention. The scope of the invention is defined by the appended claims, and all devices that come within the meaning of the claims, either literally or by equivalence, are intended to be embraced therein.

The invention claimed is:

1. A cart configured to support of one or more items therein, comprising:
    a top wall, left and right side walls, and a bottom wall in combination defining an internal volume for receipt of one or more items therein,
    wherein the top surface comprises a planar portion that is at least partially enclosed by a front edge, a right edge, a left edge, and a rear edge, wherein the planar portion includes a plurality of corners where adjacent edges intersect, wherein one or more of the front edge, right edge, left edge, and rear edge includes an upstanding portion that extends above the planar portion,
    the one or more of the front edge, right edge, left edge, and rear edge that includes the upstanding portion includes an open portion disposed proximate to the intersecting adjacent edge of the front edge, right edge, left edge, and rear edge, and
    a plurality of caps, with one of the plurality of caps disposed upon each of the plurality of corners, wherein each of the plurality of caps defines a bottom surface that contacts the planar portion of the top surface and the upstanding portion of each of the two adjacent edges at each respective corner,
    wherein each of the plurality of caps that are disposed upon the plurality of corners with an edge that includes an open portion encloses the respective open portion such that the upstanding portions of each intersecting adjacent edge extends from the respective cap.

2. The cart of claim 1, wherein the internal volume of the cart includes a shelf assembly,
    the shelf assembly comprising a frame formed from first and second vertical posts that are mounted to the bottom wall, the two vertical posts supporting a plurality of horizontal tray support members, further comprising first and second plugs that are disposed between the bottom surface and a bottom end of respective first and second vertical posts, each plug preventing direct contact between the bottom wall and the respective vertical post.

3. The cart of claim 2, wherein the first and second plugs are an elastomeric material.

4. The cart of claim 2, further comprising third and fourth plugs, wherein the third plug is disposed between the first vertical post and the top wall, and the fourth plug is disposed between the second vertical post and the top surface, wherein each of the third and fourth plugs preventing direct contact between the respective vertical post and the top wall.

5. The cart of claim 1, wherein the upstanding portion of each of the one or more of the front edge, right edge, left edge, and rear edge comprises a first portion that defines an angled face that extends at a first angle from the planar portion, and a portion of the bottom surface of each of the plurality of caps that contacts the angled face is formed with the same first angle.

6. The cart of claim 5, wherein the upstanding portion of each of the one or more of the front edge, right edge, left edge, and rear edge comprises a second portion that extends from the first portion, wherein the second portion is oriented vertically and extends below the planar portion.

7. The cart of claim 6, wherein the top surface and each of the front edge, right edge, left edge, and rear edge are formed from a single piece, wherein each of the front, right, left, and rear edges are bent away from the top surface.

8. The cart of claim 1, wherein each of the plurality of caps includes first and second apertures with longitudinal axes that are disposed perpendicularly with respect to each other and the respective longitudinal axes of the first and second apertures are disposed in parallel with the respective one of the two intersecting adjacent edges disposed in conjunction with the respective cap.

9. The cart of claim 8, further comprising a plurality of rods, wherein one of the plurality of rods is disposed in parallel to each one of the front edge, right edge, left edge, and the rear edge, and each of the plurality of rods is disposed within the first aperture on one of the plurality of caps and the second aperture in another one of the plurality of caps.

10. The cart of claim 8, wherein the first and second apertures are disposed at the same height above the planar portion.

11. The cart of claim 1, wherein each of the plurality of caps is fixed to the planar portion with a fastener that extends through a hole in the planar portion.

12. A cart configured to support of one or more items therein, comprising:
    a top surface, left and right side walls, and a bottom wall in combination defining an internal volume for receipt of one or more items therein,
    wherein the top surface comprises a planar portion and is at least partially enclosed by a front edge, a right edge, a left edge, and a rear edge, wherein the planar portion includes a plurality of corners where adjacent edges intersect, wherein each of the front edge, right edge, left edge, and rear edge includes an upstanding portion that extends above the planar portion,
    each of the front edge, right edge, left edge, and rear edge includes an open portion disposed proximate to the intersecting adjacent edge of the front edge, right edge, left edge, and rear edge, and
    a plurality of caps, with one of the plurality of caps disposed upon each of the plurality of corners, and each respective cap of the plurality of caps enclosing the open portion of the two intersecting adjacent edges at each respective corner such that the upstanding portions of each intersecting adjacent edge extends from the respective cap, wherein each of the plurality of caps defines a bottom surface that contacts the planar portion of the top surface and the upstanding portion of each of the two adjacent edges at each respective corner.

13. The cart of claim 12, wherein the upstanding portion of each of the one or more of the front edge, right edge, left edge, and rear edge comprises a first portion that defines an angled face that extends at a first angle from the planar portion, and a portion of the bottom surface of each of the plurality of caps that contacts the angled face is formed with the same first angle.

14. The cart of claim 13, wherein the upstanding portion of each of the one or more of the front edge, right edge, left edge, and rear edge comprises a second portion that extends from the first portion, wherein the second portion is oriented vertically and extends below the planar portion.

15. The cart of claim 14, wherein the top surface and each of the front edge, right edge, left edge, and rear edge are formed from a single piece, wherein each of the front, right, left, and rear edges are bent away from the top surface.

16. The cart of claim 12, wherein each of the plurality of caps includes first and second apertures with longitudinal axes that are disposed perpendicularly with respect to each other and the respective longitudinal axes of the first and second apertures are disposed in parallel with the respective one of the two intersecting adjacent edges disposed in conjunction with the respective cap.

17. The cart of claim 16, further comprising a plurality of rods, wherein one of the plurality of rods is disposed in parallel to each one of the front edge, right edge, left edge, and the rear edge, and each of the plurality of rods is disposed within the first aperture on one of the plurality of caps and the second aperture in another one of the plurality of caps.

18. The cart of claim 16, wherein the first and second apertures are disposed at the same height above the planar portion.

19. The cart of claim 12, wherein each of the plurality of caps is fixed to the planar portion with a fastener that extends through a hole in the planar portion.

20. The cart of claim 12, wherein the internal volume of the cart includes a shelf assembly,
    the shelf assembly comprising a frame formed from first and second vertical posts that are mounted to the bottom wall, the two vertical posts supporting a plurality of horizontal tray support members, further comprising first and second plugs that are disposed between the bottom surface and a bottom end of respective first and second vertical posts, each plug preventing direct contact between the bottom wall and the respective vertical post.

21. The cart of claim 20, wherein the plug is an elastomeric material.

22. The cart of claim 21, further comprising third and fourth plugs, wherein the third plug is disposed between the first vertical post and the top wall, and the fourth plug is disposed between the second vertical post and the top surface, wherein each of the third and fourth plugs preventing direct contact between the respective vertical post and the top wall.

* * * * *